United States Patent

[11] 3,615,196

[72] Inventors: Albert B. Welty, Jr., Westfield; Anantha K. S. Raman, Millington; Carl M. Lathrop, Madison, all of N.J.
[21] Appl. No.: 821,934
[22] Filed: May 5, 1969
[45] Patented: Oct. 26, 1971
[73] Assignee: Esso Research and Engineering Company
Continuation-in-part of application Ser. No. 569,980, Aug. 3, 1966, now abandoned.

[54] PROCESS FOR THE PURIFICATION OF FLUE GAS
8 Claims, 8 Drawing Figs.

[52] U.S. Cl. ........................................................ 23/168, 23/175, 23/2.5
[51] Int. Cl. .................................................. C01b 17/78, C01b 17/56
[50] Field of Search ............................................. 23/167, 168, 175, 178, 2.1; 252/440; 55/73

[56] References Cited
UNITED STATES PATENTS

| | | | |
|---|---|---|---|
| 2,617,986 | 11/1952 | Miller | 55/181 |
| 2,747,968 | 5/1956 | Pigache | 23/178 |
| 2,863,838 | 12/1958 | Vincent | 252/477 X |
| 3,300,280 | 1/1967 | Terminet | 23/175 |
| 3,308,072 | 3/1967 | Harrington et al. | 252/477 X |
| 3,436,192 | 4/1969 | Karlsson | 23/168 X |
| 3,454,356 | 7/1969 | Raman | 23/178 X |

Primary Examiner—Earl C. Thomas
Assistant Examiner—Charles B. Rodman
Attorneys—Pearlman and Stahl and Louis F. Kreek, Jr.

ABSTRACT: Sulfur dioxide is removed from flue gas by contacting the flue gas into contact with a vanadium pentoxide absorbent, then passing air in contact with the absorbent, causing desorption of $SO_3$. The reaction may be carried out in a rotating reactor containing a plurality of beds of absorbent.

PATENTED OCT 26 1971 3,615,196

Albert B. Welty, Jr.
Anantha K. S. Raman
Carl M. Lathrop    INVENTORS

Louis F. Kreek, Jr.
BY               PATENT ATTORNEY

Albert B. Welty, Jr.
Anantha K. S. Raman
Carl M. Lathrop  INVENTORS

PROCESS FOR THE PURIFICATION OF FLUE GAS

CROSS-REFERENCE TO RELATED APPLICATION

This application is a continuation-in-part of our copending application Ser. No. 569,980, filed Aug. 3, 1966 now abandoned.

BACKGROUND OF THE INVENTION

This invention relates to a process for the purification of flue gas. More particularly, the invention relates to the removal of $SO_2$ and $SO_3$ from flue gas and the conversion of these materials to sulfuric acid.

Some high sulfur coals and fuel oils which are burned in the boiler-generator units of electrical power 3, 1966 and other industrial furnaces are the source of air pollution problems in heavily populate areas. The flue gas from these fuels contains $SO_2$ and $SO_3$ and efforts are being made to develop efficient processes for removing these materials. While the problem is generally greater for electric power plants, it is also a problem for other industries where heat must be generated in a boiler and ore smelting and the like, and our process can be applied in those instances as well.

Economic considerations are dominating evaluation of the various candidate processes. Many processes for removing $SO_2$ and $SO_3$ have been developed which are satisfactory from a technical standpoint. See Bienstock et al., Bureau of Mines Information Circular 7836, U.S. Department of the Interior, 1958. However, no process has been generally accepted for commercial use since supplies and users of high-sulfur fuels are unwilling to bear the high investment and operating costs of the known processes.

Processes which provide byproduct credits are obviously more attractive and one process currently being considered involves oxidizing $SO_2$ to the trioxide over a vanadium pentoxide catalyst and condensing the latter to sulfuric acid mist which is ultimately recovered as sulfuric acid of about 70 percent concentration. See Chemical Engineering, June 8, 1964, pp. 92–94. The chief disadvantages of this process are that the sulfuric acid mist causes corrosion problems and that the demand for 70 percent sulfuric acid is not as great as the demand for more concentrated sulfuric acid such as 98 to 100 percent sulfuric acid.

SUMMARY OF THE INVENTION

We have found that $SO_2$ can be removed from flue gas in a process which excludes mist formation and which provides acid of a concentration above 95 percent.

Generally speaking the process of the invention comprises the steps of absorbing $SO_2$ from the flue gas in a solid, dry vanadium oxide catalyst at a first locus, followed by desorption of $SO_3$ in a separate zone or locus. Vanadium oxide functions as a catalyst and as an absorption-desorption medium. An oxygen containing gas is used to oxidize the $SO_2$ and $SO_3$ and to desorb the $SO_3$ from the catalyst. The $SO_3$ is absorbed from the desorbent gas into concentrated sulfuric acid with the production of approximately 99 percent sulfuric acid.

Thus, the $SO_2$ conversion technique of process is a cyclic one involving absorption and desorption in a continuous and sequential manner employing an absorption zone and a desorption zone. The catalyst acts as the carrier means between the zones. The catalyst can be moved from one zone to the other by any suitable means. One cyclic technique involves the raining solids type of reactor in which particulate catalyst falls by gravity down through the reactor and is transported to the desorption zone by entrainment in a carrier gas. Another technique involves the use of a downwardly moving bed of catalyst with the absorber placed over the desorber and with suitable sealing means between the two contacting steps. However, a principal feature of the invention is the use of a rotating reactor which provides a continuous, sequential, absorption-desorption cycle. In a preferred embodiment the catalyst is in the form of fibers and these are rotated through the cycles.

DESCRIPTION OF A PREFERRED EMBODIMENT

Figure 1:
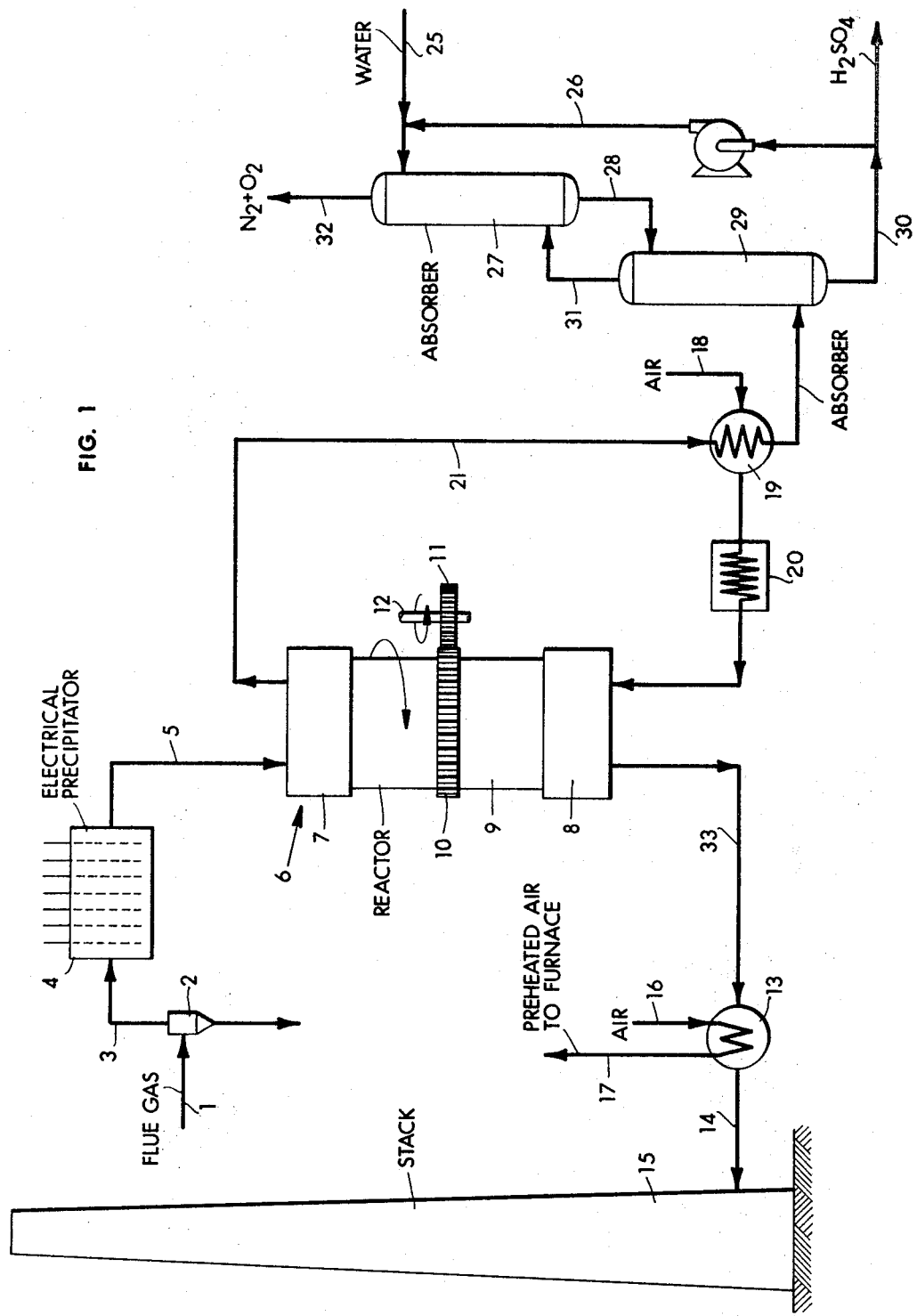
Figure 2:
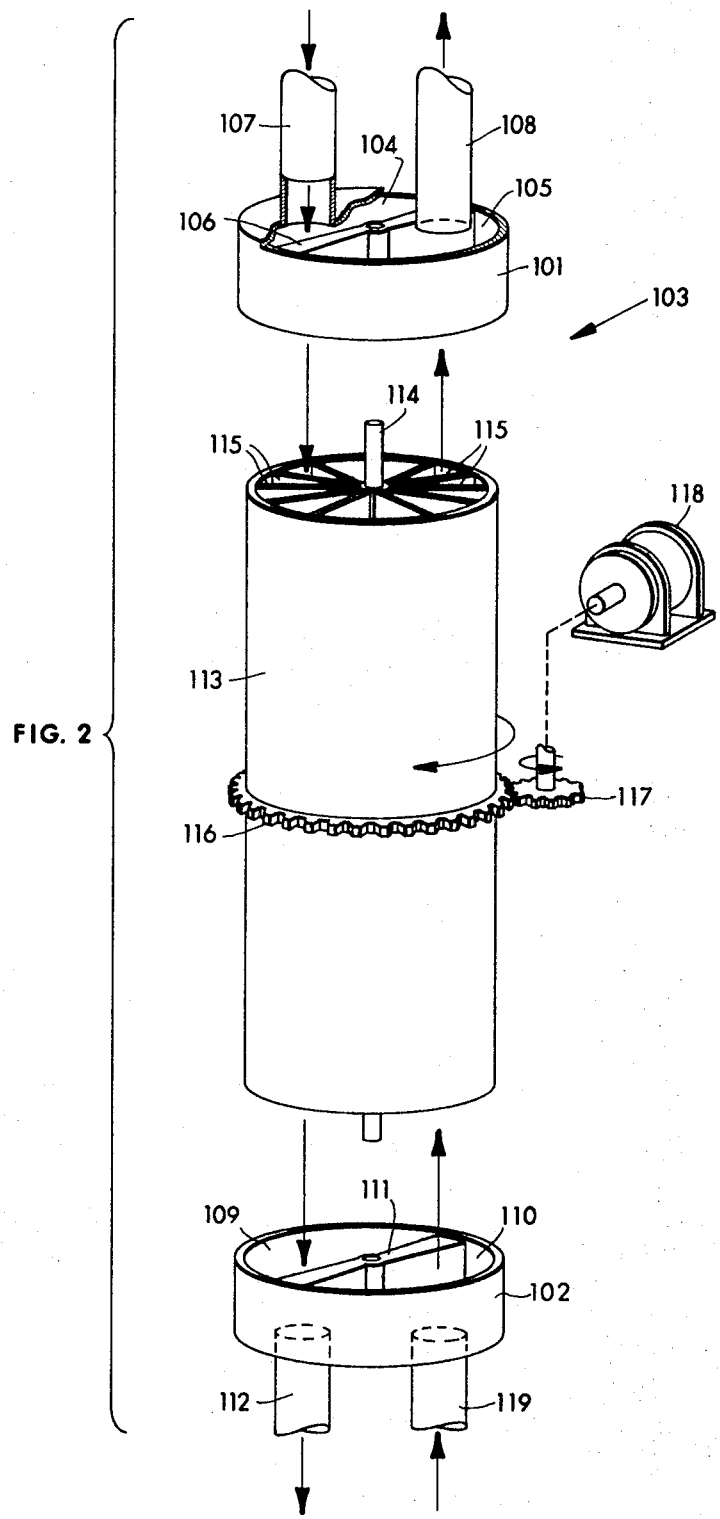

The invention will be more fully described below in conjunction with the drawings in which FIG. 1 is a diagrammatic flow sheet of one embodiment of the process, FIG. 2 is a partially exploded view of a rotating reactor, and FIGS. 3–8 are partial views showing various ways of arranging the catalyst in the sectorial catalyst compartments.

Referring to FIG. 1, flue gas from a furnace flue is fed by line 1 to a series of cyclones shown generally by reference numeral 2 and thence by line 3 to electrical precipitators 4. A typical flue gas derived from the combustion of coal or fuel oil or mixtures of these containing 2 to 6 weight percent sulfur contains about 1000 to 4000 parts per million by volume of $SO_2$ about 5 to 100 parts per million by volume of $SO_3$ and the balance is $N_2$ $O_2$ $CO_2$ $H_2 0$, NO, ash and unburned hydrocarbon. The function of the cyclones and electrical precipitators is to remove fly ash and other solids from the flue gas since these materials tend to deactivate the catalyst in continuous operations. The removal of fly ash and other solids is not an essential element of the process and when the catalyst is so placed in the reactor that solids can pass through freely, the cyclones and/or the precipitators can be eliminated.

The solids-free flue gas passes by line 5 to a rotating reactor shown generally by reference numeral 6. The upper end of the reactor 7 and the lower end of the reactor 8 are stationary and the middle portion of the reactor rotates about the vertical axis. The middle portion of the reactor is turned by a drive gear arrangement or by any other suitable means. As shown in the present embodiment a band gear 10 mounted on the reactor shell is driven in a clockwise direction by a drive gear 11. The drive gear is actuated by any suitable type of motor attached to the shaft 12.

The middle portion of the reactor is packed with a vanadium oxide catalyst. In one embodiment the rotating portion of the reactor is divided into a series of wedge-shaped sections of approximately equal volume and cross-sectional area. The catalyst can be supported in the sections by any suitable type of screen, grid, or pierced plate which permits free flow of the process gases. These details will be discussed more fully in subsequent paragraphs. It is not essential that the reactor be exactly cylindrical or that the catalyst sections be exactly wedge shaped. Any structural arrangement which will permit the catalyst sections to continuously and sequentially register with the fixed inlets and outlets in the desired manner and which forces the gas to travel in a direction parallel to the axis of rotation and prevents the gas from travelling in a direction perpendicular to the axis of rotation is satisfactory. While the reactor has been shown in a vertical position in this embodiment, it should be understood that it may also be operated in the horizontal position or inclined at any desirable angle.

Flue gas containing $SO_2$ passes continuously from line 5 through a wedge-shaped opening in the upper end of the reactor and then into each section of catalyst bed as the section rotates into a position opposite the opening. After passing downwardly through the reactor the gas passes into a corresponding wedge shaped opening at the lower end of the reactor and then into line 33. As the gas passes through the middle section of the reactor, $SO_2$ is absorbed by the catalyst. The quantity, size, and shape of the catalyst in each section is selected to that the pressure drop is relatively low. The purified flue gas in line 33 is passed through heat exchanger 13 and then by line 14 to stack 15. In the present case cold combustion air is passed by line 16 through heat exchanger 13 and then hot air is passed to the utility or industrial furnace (not shown) by line 17. Thus, flue gas entering the process at about 600° to 900° F. contacts the catalyst at a temperature of about 600° to about 900° F. and, following heat exchange, passes to the stack at a temperature of 250° to 300° F. The pressure is not critical for the operation of the process and is whatever naturally develops in order for the flue to get through the heat exchange system and out of the stack. Usually this will be less than one pound per square inch higher than atmospheric.

When the catalyst arrangement is such tat an excessive pressure drop may occur, a gas driving means or a suction means can be placed in line 5 or line 33.

In the conversion and desorbing step an oxygen containing gas such as air or oxygen-enriched air is passed by line 18 to heat exchanged 19 and heater 20. In the exchanger 19 and heater 20 the air is heated to a temperature in the range of about 900° to about 1200° F., then passed to the bottom section of the reactor. This causes $SO_3$ to be desorbed and the catalyst to be regenerated. Some of the $SO_3$ dissociates into $SO_2$ and $O_2$ at higher temperatures within the range of 900° to 1,200° F.

The effluent air containing desorbed $SO_3$ is passed by line 21 through heat exchanger 19 and thence to the sulfuric acid concentration unit. In the event that air stream in line 21 contains appreciable $SO_2$ (which it may when higher desorption temperatures are employed), this may be catalytically recombined to form $SO_3$ according to methods known in the art. The sulfuric acid unit is conventional and constitutes no part of the invention. In the embodiment shown in the drawing the proper quantity of water is added by line 25 to 99.5 percent $H_2SO_4$ in line 26, diluting the acid to 98.5 percent. This acid is passed by line 26 to absorber 27 and thence by line 28 to absorber 29. The acid countercurrently contacts the $SO_3$-air mixture, absorbing the $SO_3$ on contact. The temperature in the absorbers ranges from 175° to 250° F. Pressure is preferably slightly above atmospheric. $SO_3$ not absorbed in absorber 29 passes by line 31 to absorber 27 and gas substantially free of $SO_3$ and containing only a small amount of $SO_2$ is vented through the stack to the atmosphere by line 32. In locations where the small amount of residual $SO_3$ or the small amount of $SO_2$ is troublesome from a pollution point of view, the gas in line 32 can be returned to line 5 instead of to the atmosphere. Thus, the gas from the absorber is vented through the stack after being treated in the reactor. Suitable sulfuric acid feed to the concentration step are 98.0 to 99.9 percent acid and acids having a concentration of 98.5 to 99.5 percent are preferred.

FIG. 2 discloses a schematic view of the reactor partially broken away. The reactor comprises fixed upper and lower gas chambers 101 and 102 and a rotatable reaction vessel shown generally by reference numeral 103. The upper gas chamber is partitioned into two gas ducts 104 and 105. Although the ducts are shown as having about equal volume, they may be and usually will be different depending on the exact catalyst substance used, the operating temperature chosen or convenient to use and the amount of sulfur oxide in the flue gas. In the case of a cylindrical reactor, the partition 106 will be in the form of two wedges. The partition blanks off about 5 to 10 percent of the volume of the gas chamber and provides a seal between the input duct and the output duct. When $SO_2$ is absorbed during downflow through the reactor, duct 104 is the flue gas input duct and pipe 107 is the flue gas supply line. Also, duct 105 is the $SO_3$ output or recovery duct and pipe 108 is the $SO_3$ recovery pipe. The lower gas chamber is also partitioned into two gas ducts 109 and 110 by partition 111. When $SO_2$ is absorbed during downflow, duct 109 is the flue gas output or recovery duct and pipe 112 is the recovery pipe for the purified flue gas. Pipe 119 is the air input pipe.

When the reactor is cylindrical it consists of a shell 113 surrounding a central vertical shaft 114. A series of dividers shown generally by reference numeral 115 are employed to divide the reactor into wedge-shaped sections and these are preferably approximately equal in volume. Suitable seals, not shown, provide a seal between the reactor and the upper and lower gas chambers. The pressure on the air side of the reactor is maintained slightly above that on the flue gas side so that any tendency to leak keeps the moisture in the flue gas out of the air since moisture interferes with the proper functioning of the acid absorber. The ends of the central shaft of the reactor are fitted into rotating alignment with the gas chambers by suitable bearing means not shown. In the embodiment shown, the reactor shell is encircled by a band gear 116 and the gear is driven in the desired direction by drive gear 117 which is operatively connected to motor 118 by any suitable type of linkage.

The dimensions of the reactor, the gas chambers and the piping are dependent on the gas throughput, the quantity of $SO_2$ in the flue gas, the quantity of catalyst required, and other factors.

In operation, flue gas containing $SO_2$ is passed from duct 104 into each of the wedge sections as they pass by the duct. By the same token, oxygen-containing gas is passed simultaneously from duct 110 into and through the remaining wedge sections not blanked off by partitions 106 and 111 to convert absorbed $SO_2$ to $SO_3$ and to desorb the $SO_3$. This continuous and simultaneous contacting approach permits intimate contact of very large volumes of gas with a relatively small volume of catalyst.

Figure 3:
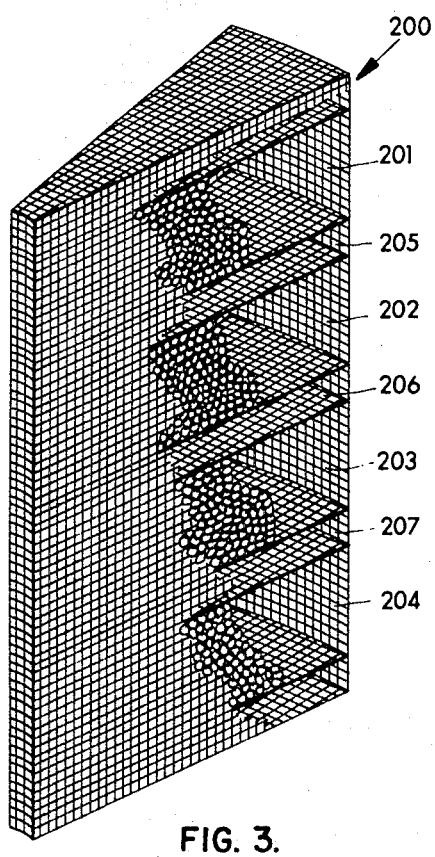

FIG. 3 discloses one type of catalyst arrangement in which a wedge-shaped section 200 is made up of a plurality of compartments 201, 202, 203 and 204. These are placed one below the other with void spaces 205, 206 and 207 disposed between the sections. Each wedge shaped section is filled with catalyst, although for illustrative purposes all the catalyst is not shown. The catalyst is held in position by groove plates and metal screens or any other means which will hold the catalyst in place on the top, bottom and sides, yet permit the minimum pressure drop as the gas passes through. This arrangement is very desirable when the flue gas contains ash since the top section 201 can be replaced frequently. This particular section contacts the ash-containing flue gas first and acts as a guard chamber for the sections below.

Figure 4:
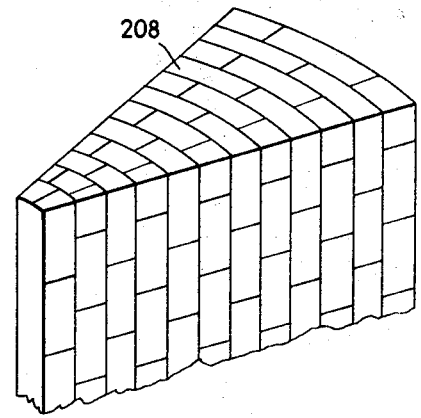
Figure 5:
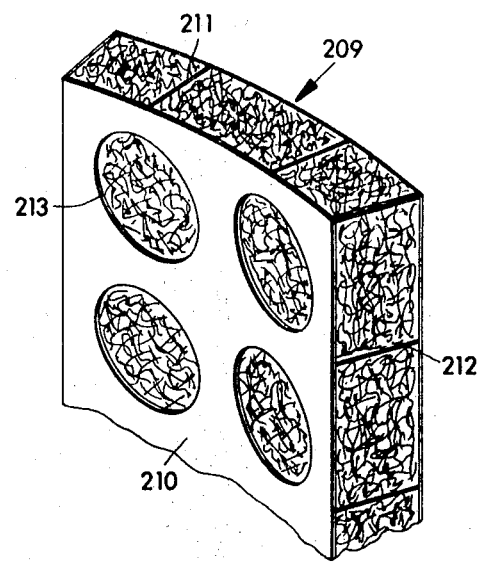

FIG. 4 discloses a portion of a wedge-shaped section made up of series of batts of appropriate size and shape. Reference numeral 208 indicates one of these and FIG. 5 provides more detail. The catalyst is prepared in the form of long fibers and these are packed into a metal frame shown generally by reference numeral 209. The frame consists of a front plate 210 and a back plate, now shown, held in spaced relationship to one another by braces 211 and 212. The top, sides and bottoms of the batt are open and the front and back contain the maximum number of holes 213 possible consistent with the structural rigidity of the batt and the necessity of holding the catalyst fibers in place. The batt can be visualized as similar to an air conditioner screen.

Figure 6:
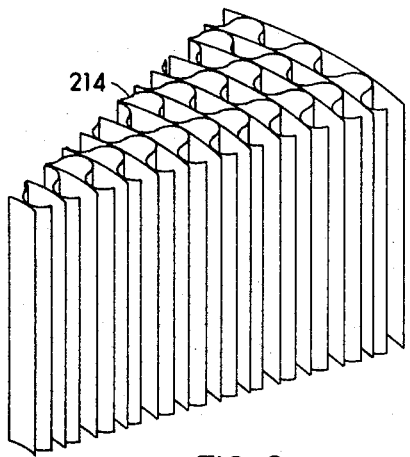
Figure 7:
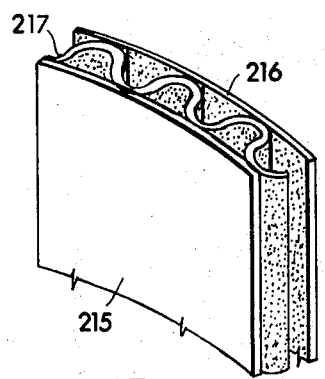

FIGS. 6 and 7 disclose a wedge-shaped section shown generally by reference numeral 214 which is made up of a series of from and back sheets 215 and 216 with a corrugated sheet 217 located between them. In this embodiment the catalyst is prepared in the desired form or a catalyst support is prepared in the desired form and soaked with a solution of catalyst. In this embodiment the catalyst sections can be visualized as similar to a series of sheets of corrugated paper.

Figure 8:
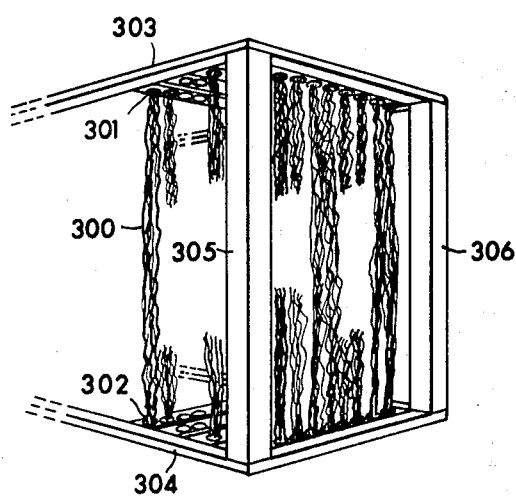

FIG. 8, a partial isometric view, discloses a preferred embodiment of the invention in which the catalyst is in the form of fibers. The vanadium oxide can be a part of the composition or mixture from which the fibers are prepared or the fibers can be used as a support carrier with the vanadium oxide disposed on the surface of the fibers by soaking the latter in a solution of the catalyst and drying. A particularly suitable fiber material is fiber glass and the vanadium oxide can be deposited on the fiber glass by known means. The dimensions of the fibers can be selected on the basis of engineering requirements. Reference numeral 300 refers to a bundle of fibers held in vertical alignment at the top end 301 and the bottom end 302. A plurality of bundles of fibers are placed in shaped relationship and supported by a frame, having a top section 303, a bottom section 304 and vertical supports 305 and 306. The frame can be wedge shaped or it can be of any other suitable shape and size suitable for placement in the reactor The fibers are attached at the ends without any tension so that they may move back and forth in the horizontal plane, thus promoting good contact with the gas without pressure drop. Ash and other solids will pass through the catalyst sections without depositing on the catalyst.

The catalyst and support structure will occupy from 1 to 70 percent of the total volume of the rotating reactor, preferably from 10 to 30 percent.

A typical particulate $SO_2$ $SO_3$ conversion catalyst consists of 5 to 10 weight percent vanadium pentoxide plus 8 to 15 percent potassium oxide on a suitable carrier such as silica, silica-alumina, alumina, mullite and zircon-mullite. Alternatively, the catalyst may consist of potassium-vanadium sulfates and pyrosulfates without a support. Such sulfates form a glasslike substance which can be put into the form of fibers, for example, by known techniques. These fibers can then be used in the manner already described.

Other alkali metals such as sodium, rubidium, cesium, etc., may be substituted for potassium, but the latter appears to be the best material from the standpoint of activity and cost.

Without wishing to be bound by any theory, we postulate the reactions to be of the type:

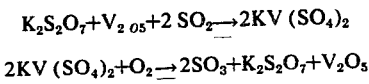

$$2KV(SO_4)_2 + O_2 \rightarrow 2SO_3 + K_2S_2O_7 + V_2O_5$$

The rate of desorptions is temperature-dependent and is quite slow at temperatures below about 800° F. As the desorption temperature rises, the rate becomes more rapid. At temperatures above about 1,200° F., a substantial quantity of $SO_2$ appears in the effluent even through oxygen is present, requiring recombination with oxygen to form $SO_3$ furthermore, catalyst life is shortened at temperatures above 1,200° F.

The invention will be further described with reference to the following illustrative examples.

EXAMPLE 1

The following example is typical of the operation of the process of the invention. A 333 MW power station burning fuel oil containing 4.0 weight percent sulfur produces about 9,600 standard CF of flue gas per second at a temperature of 800° F. and 770 mm. Hg pressure. The flue gas contains 2,700 VPPM $SO_2$ and 20 VPPM $SO_3$. The working capacity of the catalyst is 2 pounds $SO_2$ per 100 pounds of catalyst. The reactor rotates at 1.5 r.p.m. It is charged with 8,800 pounds of catalyst in fiber form arranged with the strands parallel to the line of gas flow. Air is fed continuously at a rate of 855 standard CF per second at a temperature of 1,100° F. The chambers are arranged st each end so that the flue gas passes through a segment corresponding to 140° of the circle, and the two blanked off areas separating the air and flue gas steams correspond each to 20° of the circle. The rotating element is 8 feet long. The flue gas actual velocity is 29 feet per second and the air velocity is 2.0 feet per second. The physical volume occupied by the fiber catalyst is 1.7 percent of the total reactor volume. Pressure drop on the flue gas side through the reactor system is 6 inches $H_2O$ and on the air side is negligible. The air leaving the reactor contains 2.9 volume percent $SO_3$ and 0.06 volume percent $SO_2$. This gas is cooled to 380° F. and passes to an acid absorption tower. 99.0 percent $H_2SO_4$ enters the top of the tower at 180° F. and 99.5 percent acid leaves the bottom of the tower. Virtually all the $SO_3$ is removed from the air and the air containing 0.06 volume percent $SO_2$ passes to the stack to exit with the flue gas. The net production of acid, calculated as 100 percent $H_2SO_4$ is 275 short tons per day. The flue gas leaving the stack has been reduced to 140 VPPM $SO_2$ and less than 5 VPPM $SO_3$.

EXAMPLE 2

This example illustrates desulfurization of flue gas in a cyclic regenerative process, employing a supported vanadium pentoxide catalyst and using air as the regeneration gas.

The catalyst used in this example was a $K_2O$-$V_2O_5$ on silica catalyst, containing about 10 percent by weight $K_2O$, about 10 percent by weight $V_2O_5$ and having an initial sulfur content of about 10 percent by weight (as S) and a surface area of about 69 square meters per gram. 30 cc. of this catalyst was loaded into a cylindrical reactor 1 inch diameter. The catalyst was heat treated for about 20 hours with air passing through the catalyst bed at about 1,100° F. and 2,000 v./v./hr. to remove the sulfur. Flue gas and air were alternately passed through the catalyst bed through four operating cycles. In each cycle flue gas containing 0.3 percent $SO_2$ by volume was heated to a temperature of 800° F. and a space velocity of 2,000 v./v./hr. Air was passed through the catalyst bed at a temperature of 1,100° F. and a space velocity of 2,000 v./v./hr. in each operating cycle in order to regenerate the catalyst and to desorb $SO_3$. Data for the four operating cycles are given in table I below.

TABLE I

| | Desulfurization | | Regeneration | |
|---|---|---|---|---|
| | Flue gas (0.3% $SO_2$) 800° F., 1 atm. 2,000 v./v./hr. | | Air 1100° F., 1 atm. 2,000 v./v./hr. | |
| Cycle | Time | %$SO_2$ removed | Time | Vol. % $SO_2$ in effluent |
| 1 | 0:00 | 100 | 0:00 | 2.0 |
|   | 5:15 | 90  | 0:56 | 0.5 |
|   | 5:5  | 50  |      |     |
| 2 | 0:00 | 100 | 0:00 |     |
|   | 2:30 | 100 | 0:15 |     |
| 3 | 0:00 | 100 | 0:0  | 0.50 |
|   | 3:40 | 100 | 1:00 | 0.14 |
|   | 4:10 | 70  |      |     |
| 4 | 0:00 | 100 | 0:00 |     |
|   | 2:50 | 97  | 0:10 | 0.72 |
|   | 3:20 | 70  | 1:10 | 0.15 |

The process of the invention provides a number of advantages over the prior art by employing the vanadium oxide-type catalyst both as a catalyst and as an absorbent and by a continuous, alternating absorption-desorption cycle. For example, in many prior art processes, the flue gas must be cooled to about 200° F. in order to remove $SO_3$ and $H_2SO_4$. This is a lower stack temperature than one would desire because the cool gas will not rise into the air from the flue gas stack. In our process there is no restriction on the final fuel gas temperature and it can be reduced to whatever is optimum with respect to heat economy and plume rise. Furthermore, the byproduct is a high quality sulfuric acid which does not present corrosive condition in its formation from $SO_3$ in the acid concentration step. Whereas other flue gas processes developed so far cost the operator money, out process provides a real possibility of a flue gas purification process which will result in a profit for the user.

WHAT IS CLAIMED IS:

1. A process for the conversion of $SO_2$ in flue gas to $SO_3$ comprising the cyclic and sequential steps of continuously passing the flue gas at a temperature of about 600° to 900° F. into contact with a catalyst comprising potassium oxide and vanadium pentoxide catalyst in an absorption zone then continuously passing the catalyst containing absorbed $SO_2$ into contact with an oxygen containing gas at a temperature of about 900° to about 1,200° F. in a conversion and desorption zone and recovering desorbed $SO_3$ whereby vanadium oxide functions as the catalyst and as the absorbent.

2. A process for the convention of $SO_2$ in flue gas to $SO_3$ comprising the sequential steps of:
   a. continuously passing the flue gas at a temperature of about 600° to 900° F. into contact with a plurality of moving beds of catalyst comprising potassium oxide and vanadium pentoxide at a first locus; b. absorbing the $SO_2$ on the catalyst;
   c. then continuously contacting the moving catalyst beds with an oxygen containing gas at a temperature of about 900° to 1,200° F., thereby converting $SO_2$ to $SO_3$ to a second locus;
d. desorbing $SO_3$ from the catalyst at said second locus; and
e. recovering $SO_3$.

3. A process for removing $SO_2$ from flue gas comprising the steps of continuously:
a. removing solids from the flue gas in a solid separation zone;
b. passing the flue gas to a fixed flue gas input zone;
c. passing said flue gas at a temperature of about 600° to about 900° F. from said input zone to and through a mass of an absorption catalyst comprising potassium oxide and vanadium pentoxide and arranged in rotatable sectorial catalyst compartments as each of said compartments is rotated to a position opposite the input zone, whereby $SO_2$ is absorbed on the catalyst as the flue gas passes through the compartments in intimate contact with the catalyst;
d. passing $SO_2$-free flue gas to a fixed flue gas recovery zone which is in substantially linear flow alignment with said fixed flue gas input zone;
e. rotating the catalyst compartments containing absorbed $SO_2$ to register with an oxygen containing gas input zone;
f. passing an oxygen containing gas at a temperature of about 900° to about 1,200° F. to and through each sectorial catalyst compartment as each of said catalyst compartments containing absorbed $SO_2$ registers with the oxygen containing gas input zone whereby $SO_2$ is converted to $SO_3$ and $SO_3$ is desorbed from the catalyst as the oxygen containing gas passes through the compartments in intimate contact with the catalyst.
g. passing $SO_3$ rich gas to a fixed gas recovery zone which is in substantially linear flow alignment with said oxygen containing gas input zone;
h. passing said $SO_3$ rich gas into a sulfuric acid contacting zone;
i. a recovering sulfuric acid of increased concentration.

4. A process for the purification of flue gas containing $SO_2$ comprising the steps of:
a. passing flue gas from a flue to a solids separation zone wherein solids are removed from the gas;
b. passing said gas at a temperature of about 600° to about 900° F. to a rotating reactor, said reactor being divided into a plurality of contacting zones, each zone containing catalyst comprising potassium oxide and vanadium pentoxide disposed within the zone so that a maximum amount of gas-catalyst contact is achieved with a minimum amount of pressure drop;
c. passing said gas into an end of each of said zones as the zone rotates to a position opposite the gas input line;
d. passing said gas through each contacting zone whereby the gas intimately contacts the catalyst and the $SO_2$ in said gas is absorbed by the catalyst;
e. rotating each of said absorbed $SO_2$ containing zones to a position opposite an air input line;
f. passing air at a temperature of about 900° to about 1,200° F. through each of said $SO_2$ containing zones whereby $SO_2$ is converted to $SO_3$;
g. absorbing the $SO_3$ in $H_2SO_4$;
h. and recovering $H_2SO_4$ of increased concentration.

5. In a process for the purification of flue gas involving absorbing $SO_2$ in said gas on a catalyst comprising potassium oxide and vanadium pentoxide and converting $SO_2$ to $SO_3$ by desorbing with an oxygen containing gas, the improvement which comprises carrying out the absorption at a temperature of about 900° to about 1,200° F., continuously rotating the catalyst mass sequentially to and through an absorption stage and then to and through a desorption stage, said stages being operated simultaneously.

6. A process according to claim 5 in which the catalyst is in the form of fibers.

7. A process according to claim 5 wherein said catalyst comprises about 8 to 15 percent by weight of potassium oxide and about 5 to 10 percent by weight of vanadium pentoxide supported on a carrier.

8. A process according to claim 7 in which carrier is silica.

* * * * *